United States Patent
Wu et al.

(10) Patent No.: US 10,863,472 B2
(45) Date of Patent: Dec. 8, 2020

(54) METHOD AND DEVICE OF COMMUNICATING WITH A LTE NETWORK AND A NR NETWORK

(71) Applicant: HTC Corporation, Taoyuan (TW)

(72) Inventors: Chih-Hsiang Wu, Taoyuan (TW);
Win-Chyi Gong, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/124,207

(22) Filed: Sep. 7, 2018

(65) Prior Publication Data

US 2019/0075537 A1 Mar. 7, 2019

Related U.S. Application Data

(60) Provisional application No. 62/555,064, filed on Sep. 7, 2017.

(51) Int. Cl.
*H04W 60/00* (2009.01)
*H04W 76/15* (2018.01)
(Continued)

(52) U.S. Cl.
CPC ......... *H04W 60/005* (2013.01); *H04W 36/14* (2013.01); *H04W 60/04* (2013.01);
(Continued)

(58) Field of Classification Search
CPC ............. H04L 65/1016; H04L 65/1069; H04L 65/1006; H04L 45/64; H04L 41/0813; H04L 41/0823; H04L 63/0245; H04L 63/0263; H04L 63/10; H04L 43/0876; H04L 61/2007; H04L 65/1063; H04L 65/1073; H04L 65/1083; H04L 41/0806; H04L 41/0893; H04L 43/0811; H04L 43/0817; H04L 45/22; H04L 45/302; H04L 47/70; H04L 5/006; H04L 65/1059; H04L 65/1096; H04L 1/0026; H04L 29/06;
(Continued)

(56) References Cited

U.S. PATENT DOCUMENTS

2011/0002327 A1* 1/2011 Dwyer ................ H04W 48/18
370/352
2011/0092198 A1* 4/2011 Miyata .............. H04W 36/0022
455/422.1

(Continued)

OTHER PUBLICATIONS

U.S. Appl. No. 62/419,953 (Priority Application of US 2018/0132141 by Huang-Fu), dated Nov. 9, 2016 (Year: 2016).*
(Continued)

*Primary Examiner* — Daniel Lai
(74) *Attorney, Agent, or Firm* — Winston Hsu

(57) ABSTRACT

A communication device for communicating with a long-term evolution (LTE) network and a new radio (NR) network comprises at least one storage device; and at least one processing circuit coupled to the at least one storage device. The at least one storage device stores, and the at least one processing circuit is configured to execute instructions of: the communication device registering to the LTE network and the NR network; and performing an IP multimedia subsystem (IMS) registration via the LTE network but not via the NR network, when registering to the LTE network and the NR network.

7 Claims, 5 Drawing Sheets

(51) Int. Cl.
*H04W 60/04* (2009.01)
*H04W 36/14* (2009.01)
*H04W 76/36* (2018.01)
*H04W 76/12* (2018.01)

(52) U.S. Cl.
CPC .......... *H04W 76/12* (2018.02); *H04W 76/15* (2018.02); *H04W 76/36* (2018.02)

(58) Field of Classification Search
CPC . H04L 41/06; H04L 41/0659; H04L 41/0668; H04L 41/0803; H04L 41/5025; H04L 41/5054; H04L 41/509; H04L 45/00; H04L 47/24; H04L 65/00; H04W 76/10; H04W 36/14; H04W 48/18; H04W 60/04; H04W 72/085; H04W 88/06; H04W 24/02; H04W 36/22; H04W 76/12; H04W 36/00; H04W 36/0055; H04W 72/0406; H04W 76/15; H04W 76/27; H04W 36/04; H04W 36/165; H04W 60/00; H04W 60/005; H04W 60/06; H04W 68/00; H04W 68/005; H04W 72/044; H04W 72/08; H04W 76/00; H04W 76/30; H04W 24/04; H04W 28/00; H04W 28/0231; H04W 28/0252; H04W 28/0268; H04W 28/12; H04W 36/0016; H04W 36/0027; H04W 36/24; H04W 40/24; H04W 52/02; H04W 52/0209; H04W 52/0222; H04W 52/0274; H04W 68/02; H04W 72/04; H04W 72/042; H04W 72/087; H04W 80/10; H04W 8/06; H04W 76/36
See application file for complete search history.

(56) References Cited

U.S. PATENT DOCUMENTS

| | | | |
|---|---|---|---|
| 2013/0201850 A1* | 8/2013 | Swaminathan ... | H04W 72/1215 370/252 |
| 2015/0327207 A1* | 11/2015 | Bharadwaj .............. | H04W 4/60 455/435.2 |
| 2017/0094485 A1* | 3/2017 | Saxena ............... | H04L 41/0813 |
| 2017/0105193 A1* | 4/2017 | Liu ........................ | H04W 68/12 |
| 2017/0134994 A1* | 5/2017 | Chinthalapudi ...... | H04W 76/18 |
| 2017/0339609 A1* | 11/2017 | Youn .................... | H04W 76/11 |
| 2018/0054767 A1* | 2/2018 | Gholmieh ......... | H04W 36/0022 |
| 2018/0132141 A1* | 5/2018 | Huang-Fu .......... | H04L 65/1016 |
| 2018/0288657 A1* | 10/2018 | Stojanovski ...... | H04W 36/0055 |
| 2019/0313326 A1* | 10/2019 | Takeda ................. | H04W 48/18 |

OTHER PUBLICATIONS

Samsung, Intel Corporation, ITL, KT Corp., LG Electronics Inc., "Dual Registration for loose interworking between NR and LTE", 3GPP TSG-RAN WG2 Meeting#97; R2-1701296, Feb. 17, 2017. "https://www.3gpp.org/DynaReport/TDocExMtg--R2-97--17054. htm", pp. 1-3.

China Mobile, "Discussion on requirement on dual registration for supporting IMS voice continuity", SA WG2 Meeting #121; S2-173037, May 19, 2017, Hangzhou, China, pp. 1-2.

Office action dated Jun. 19, 2019 for the Taiwan application No. 107131625, filing date Sep. 7, 2018, pp. 1-8.

* cited by examiner

METHOD AND DEVICE OF COMMUNICATING WITH A LTE NETWORK AND A NR NETWORK

CROSS REFERENCE TO RELATED APPLICATIONS

This application claims the benefit of U.S. Provisional Application No. 62/555,064 filed on Sep. 7, 2017, which is incorporated herein by reference.

BACKGROUND OF THE INVENTION

1. Field of the Invention

The present invention relates to a device and a method used in a wireless communication system, and more particularly, to a device and a method of communicating with a long-term evolution (LTE) network and a new radio (NR) network.

2. Description of the Prior Art

In a long-term evolution (LTE) system, a radio access network known as an evolved universal terrestrial radio access network (E-UTRAN) includes at least one evolved Node-B (eNB) for communicating with a user equipment (UE), and for communicating with a core network. In a fifth generation (5G) system, a radio access network includes at least one 5G base station (BS) (or called gNB) for communicating with a UE and for communicating with a core network. However, how a dual mode UE performs an IP multimedia subsystem (IMS) service is unknown.

SUMMARY OF THE INVENTION

A communication device for communicating with a long-term evolution (LTE) network and a new radio (NR) network, comprises at least one storage device; and at least one processing circuit, coupled to the at least one storage device, wherein the at least one storage device stores, and the at least one processing circuit is configured to execute instructions of: the communication device registering to a LTE network and a NR network; and performing a first IP multimedia subsystem (IMS) registration via the LTE network and performing a second IMS registration via the NR network, when registering to the LTE network and the NR network.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
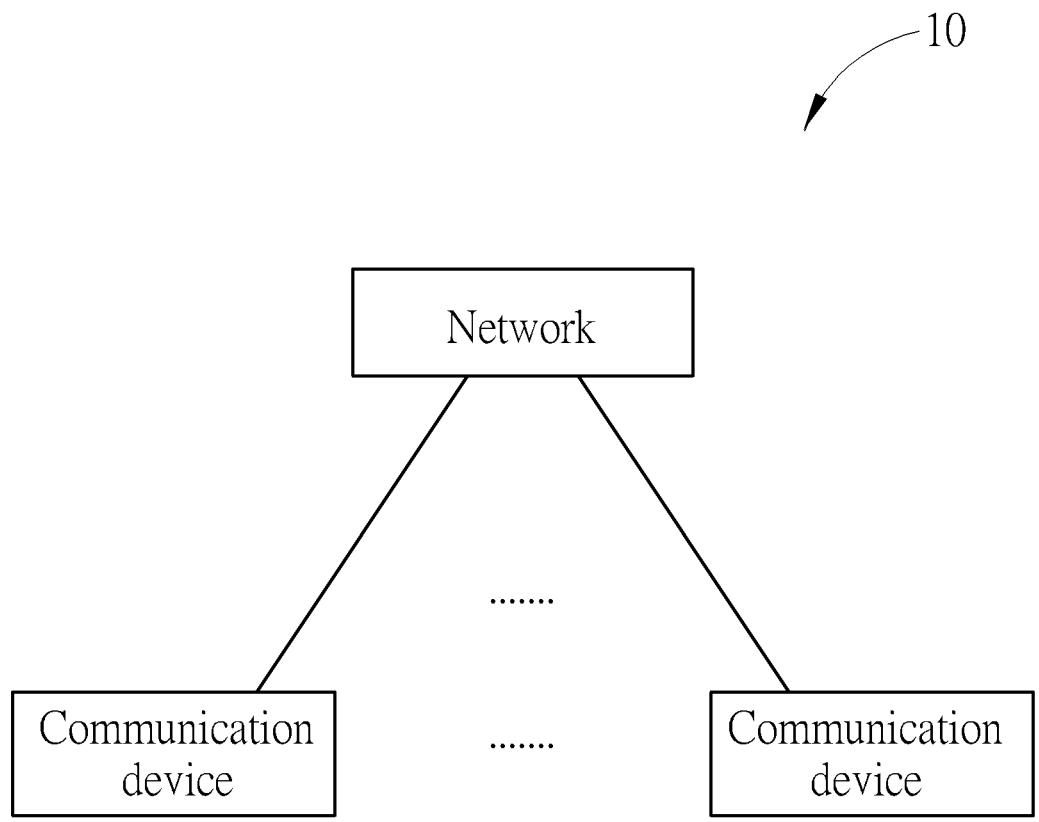
FIG. 1 is a schematic diagram of a wireless communication system according to an example of the present invention.

In FIG. 1, a wireless communication system 10 is briefly composed of a network and a plurality of communication devices. The network and the communication device communicate with each other via one or multiple cells (e.g., multiple carriers) belonging to one or multiple base stations (BSs).

Practically, the network is a long-term evolution (LTE) network or a fifth generation (5G) network (or called NR network). A LTE network includes an evolved universal terrestrial radio access network (E-UTRAN) including at least one evolved Node-B (eNB) and includes an Evolved Packet Core Network (EPC). A NR network includes a 5G radio access network including at least one 5G base station (BS) (or called gNB) and includes a 5G Core (5GC) network.

Figure 2:
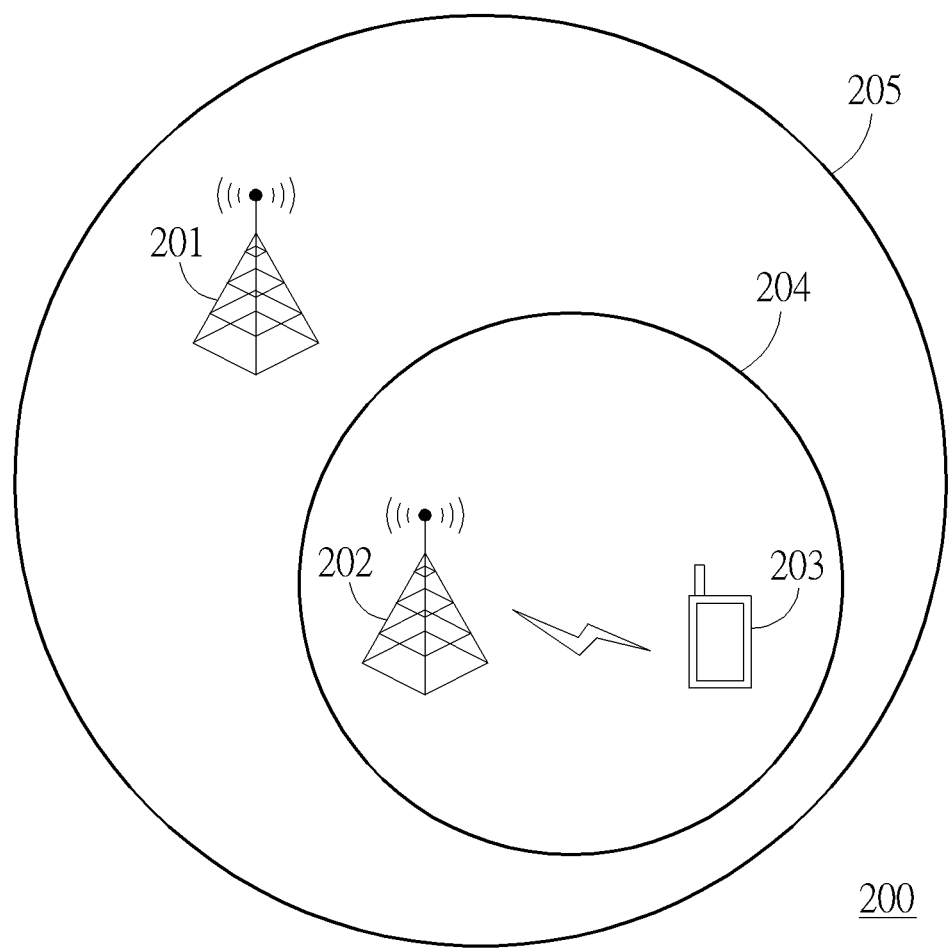
FIG. 2 is a schematic diagram of a wireless communication system according to an example of the present invention.

In FIG. 2, a user equipment (UE) may be in coverage area of an eNB 201 and in coverage area of a gNB 202 on different carrier frequencies. In a typical configuration, the UE camps on a first cell of the gNB 202, since the gNB 202 is a 5G BS and serves the UE with a higher data rate than the eNB 201.

A communication device may be a UE, a mobile phone, a laptop, a tablet computer, an electronic book, a portable computer system, a vehicle, a ship or an aircraft. In addition, the network and the communication device can be seen as a transmitter or a receiver according to direction (e.g., transmission direction), e.g., for an uplink (UL), the communication device is the transmitter and the network is the receiver, and for a downlink (DL), the network is the transmitter and the communication device is the receiver.

Figure 3:
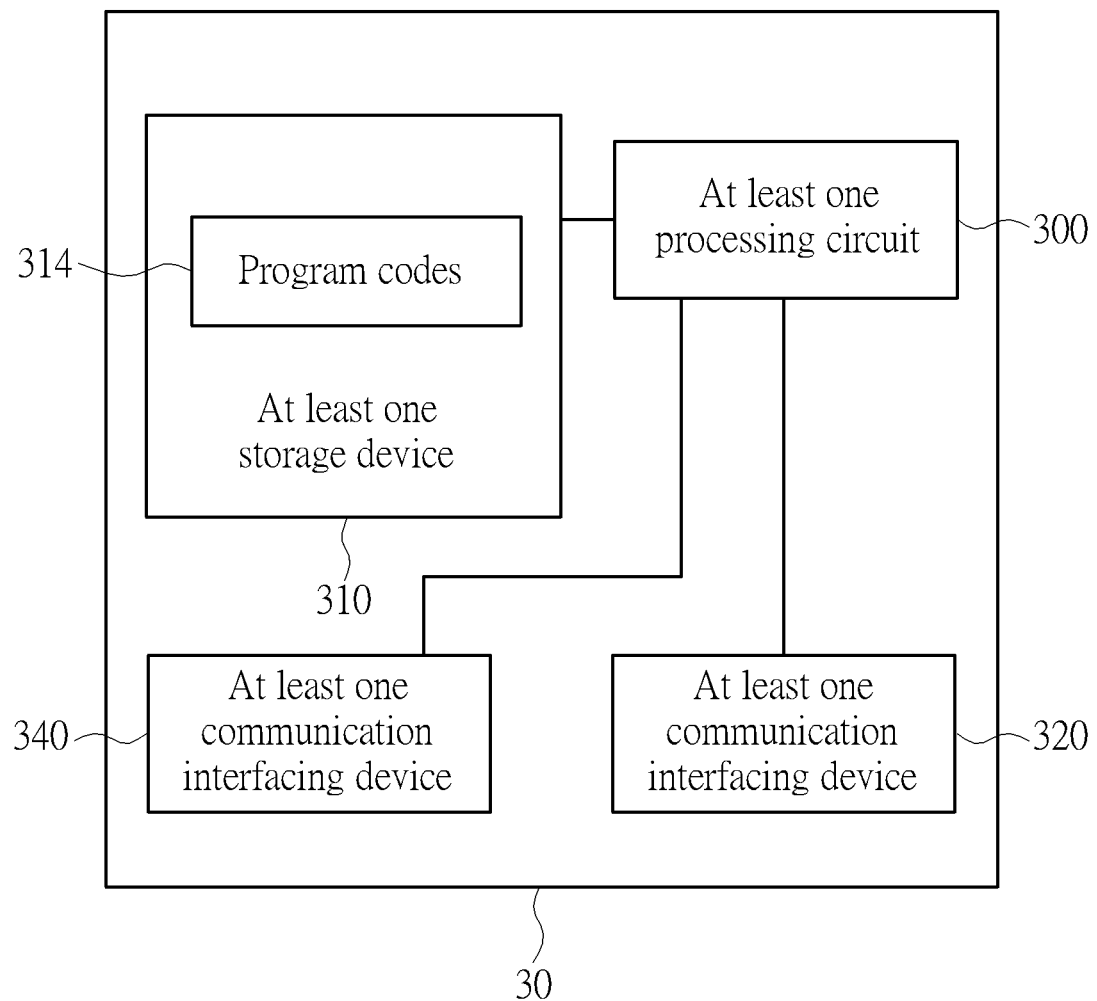
FIG. 3 is a schematic diagram of a communication device according to an example of the present invention.

In FIG. 3, a communication device 30 is the communication device or the network shown in FIG. 1, but is not limited herein. The communication device 30 includes at least one processing circuit 300 such as a microprocessor or Application Specific Integrated Circuit (ASIC), at least one storage device 310, at least one communication interfacing device 320 and at least one communication interfacing device 340. The at least one storage device 310 includes any data storage device that stores program codes 314, accessed and executed by the at least one processing circuit 300. Examples of the at least one storage unit 310 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The at least one communication interfacing device 320 includes at least one transceiver for transmitting and receiving signals (e.g., data, messages and/or packets) to/from the LTE network according to processing results of the at least one processing circuit 300. The at least one communication interfacing device 340 includes at least one transceiver used to transmit and receive signals (e.g., data, messages and/or packets) to/from the NR network according to processing results of the at least one processing circuit 300.

In the following examples, a UE is used for representing the communication device, to simplify the illustration of the examples.

Figure 4:
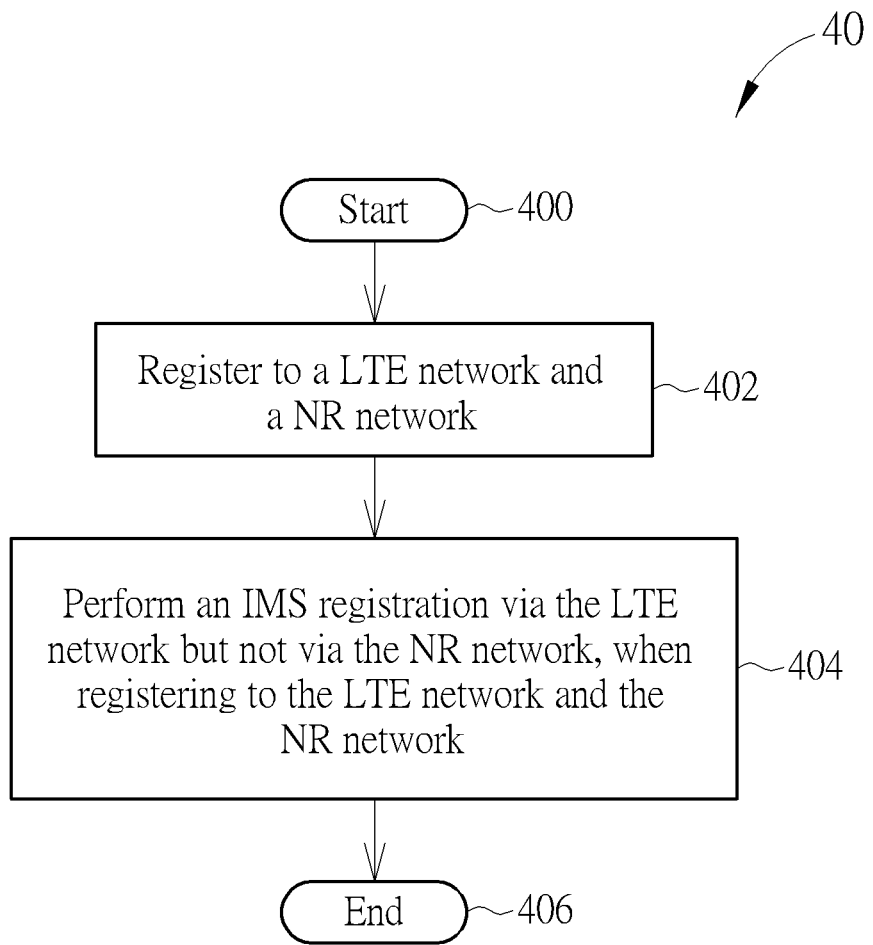
FIG. 4 is a flowchart of a process according to an example of the present invention.

A process 40 in FIG. 4 may be utilized in a UE communicating with a LTE network and a NR network, and includes the following steps:

Step 400: Start.

Step 402: Register to the LTE network and the NR network.

Step 404: Perform an IP multimedia subsystem (IMS) registration via the LTE network but not via the NR network, when registering to the LTE network and the NR network.

Step 406: End.

According to the process 40, the UE determines to perform the IMS registration via the LTE network but determines not to perform the IMS registration via the NR network. Correspondingly, the UE only initiates an IMS service (e.g., a mobile originating IMS service) via the LTE network but not via the NR network. Correspondingly, a network including the LTE network and the NR network pages the UE via the LTE network but does not page the UE via the NR network, for a mobile terminating IMS service.

In one example, the UE establishes a Packet Data Network (PDN) connection with the LTE network by performing a PDN connectivity procedure with the LTE network. The LTE network configures an Evolved Packet System (EPS) bearer associated to the PDN connection to the UE. The UE transmits a first Session Initiation Protocol (SIP) message (e.g., Register message) on a data radio bearer (DRB) associated with the EPS bearer via the LTE network, to perform the IMS registration. The UE receives a second SIP message (e.g., 200 OK message) responding to the first SIP message on the DRB.

In one example, if the UE fails to perform the IMS registration via the LTE network, the UE may perform the IMS registration via the NR network.

In one example, when the UE has an IMS service (e.g., the mobile originating IMS service or the mobile terminating IMS service) via the LTE network after performing the IMS registration, the UE suspends a NR operation (e.g., not receiving any signal from the NR network). When suspending the NR operation, the UE may operate its NR receiver/transmitter (e.g., radio frequency (RF) chip) to enter a sleep mode or a low power mode to save power consumption. In this case, the UE may initiate/perform an internet service via the LTE network instead of the NR network. After finishing (e.g., ending) the IMS service (e.g., the UE enters an idle mode or a light radio resource control (RRC) connection mode), the UE resumes the NR operation. When resuming the NR operation, the UE receives synchronization signal(s) (e.g., primary/secondary synchronization signal(s)), master information block(s) (MIB) and system information block(s) (SIB(s)) from a NR cell. Then, the UE may perform a registration procedure with the NR network by transmitting a REGISTRATION REQUEST message to the NR network via the NR cell.

In one example, when the UE has the IMS service via the LTE network after performing the IMS registration, the UE keeps the NR operation. Thus, the UE may perform the internet service via the NR network while having the IMS service.

Figure 5:
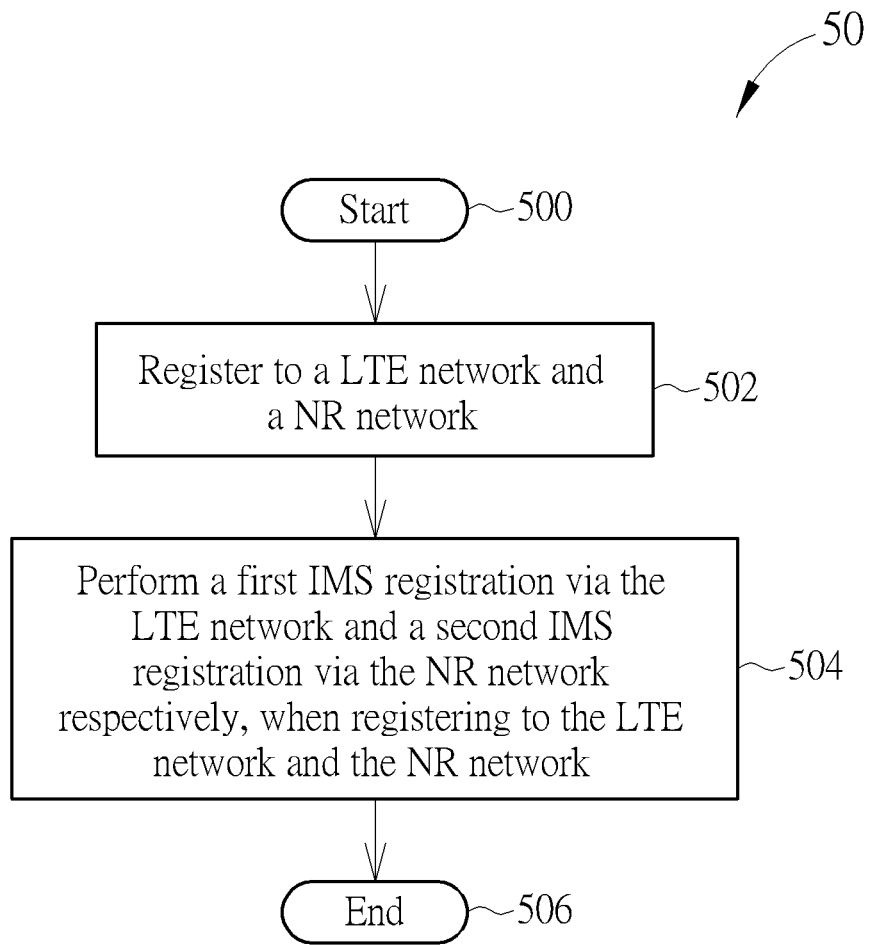
FIG. 5 is a flowchart of a process according to an example of the present invention.

A process 50 in FIG. 5 may be utilized in a UE communicating with a LTE network and a NR network, and includes the following steps:

Step 500: Start.

Step 502: Register to the LTE network and the NR network.

Step 504: Perform a first IMS registration via the LTE network and a second IMS registration via the NR network respectively, when registering to the LTE network and the NR network.

Step 506: End.

According to the process 50, the UE determines to perform the first IMS registration via the LTE network and determines to perform the second IMS registration via the NR network. Correspondingly, the UE may initiate an IMS service (e.g., a mobile originating IMS service) via the LTE network or via the NR network. Correspondingly, the LTE network may page the UE for a mobile terminating IMS service (e.g; IMS voice call, IMS video call or IMS short message). Correspondingly, the NR network may page the UE for the mobile terminating IMS service. That is, a dual mode UE can perform a 4G IMS service and a 5G IMS service via different networks.

In one example, the UE establishes a PDN connection with the LTE network by performing a PDN connectivity procedure with the LTE network. The LTE network configures an EPS bearer associated to the PDN connection to the UE. The UE transmits a first SIP message (e.g; Register message) on a DRB associated with the EPS bearer via the LTE network, to perform the first IMS registration. The UE may receive a second SIP message (e.g., 200 OK message) responding to the first SIP message on the DRB.

In one example, the UE establishes a Protocol Data Unit (PDU) Session with the NR network by performing a PDU Session establishment procedure with the NR network. The UE transmits a third SIP message (e.g., Register message) on a DRB associated to the PDU Session via the NR network, to perform the second IMS registration. The UE receives a fourth SIP message (e.g., 200 OK message) responding to the third SIP message on the DRB.

In one example, when the UE has an IMS service via the LTE network after performing the first IMS registration and the second IMS registration, the UE suspends a NR operation (e.g., not receiving any signal from the NR network). When suspending the NR operation, the UE may operate its NR receiver/transmitter (e.g., RF chip) to enter a sleep mode or a low power mode to save power consumption. In this case, the UE may initiate/perform an internet service via the LTE network instead of the NR network. After finishing (e.g., ending) the IMS service (e.g., the UE enters an idle mode or a light RRC connection mode), the UE may resume the NR operation. When resuming the NR operation, the UE receives synchronization signal(s) (e.g., primary/secondary synchronization signal (s)), MIB (s) and SIB (s) from a NR cell. Then, the UE may perform a registration procedure with the NR network by transmitting a REGISTRATION REQUEST message to the NR network via the NR cell.

In one example, when the UE has an IMS service (e.g., the mobile originating IMS service or the mobile terminating IMS service) via the NR network after performing the first IMS registration and the second IMS registration, the UE suspends a LTE operation (e.g., not receiving any signal from the LTE network). When suspending the LTE operation, the UE may operate its LTE receiver/transmitter (e.g., RF chip) to enter a sleep mode or a low power mode to save power consumption. In this case, the UE may initiate/perform an internet service via the NR network instead of the LTE network. After finishing (e.g., ending) the IMS service (e.g., the UE enters the idle mode or the inactive mode), the UE resumes the LTE operation. When resuming the LTE operation, the UE receives synchronization signal(s) (e.g., primary/secondary synchronization signal(s)), the MIB(s) and the SIB(s) from a LTE cell. Then, the UE may perform a tracking update procedure with the LTE network by transmitting a TRACKING AREA UPDATE REQUEST message to the LTE network via the LTE cell.

In another example, when the UE has an IMS service via the LTE network after performing the first IMS registration and the second IMS registration, the UE may keep/maintain a NR operation. Thus, the UE may perform an internet service via the NR network. In one example, when the UE has the IMS service via the NR network after performing the first IMS registration and the second IMS registration, the UE may keep/maintain the LTE operation. Thus, the UE may perform the internet service via the LTE network.

In one example, when the UE has an IMS service via the LTE network after performing the first IMS registration and the second IMS registration, the UE ignores a paging for a mobile terminating call from the NR network. In this case, the UE may perform an internet service via the NR network.

In one example, when the UE has the IMS service via the NR network after performing the first IMS registration and the second IMS registration, the UE ignores a paging for a mobile terminating call from the LTE network. In this case, the UE may perform the internet service via the LTE network. Alternatively, while having the IMS service via the NR network, the UE may not be allowed to perform the internet service via the LTE network (or the UE may be configured to not perform the internet service via the LTE network, or the UE may determine not to perform the internet service via the LTE network).

In one example, when the UE has an IMS service via the LTE network after performing the first IMS registration and the second IMS registration, the UE rejects a mobile terminating call from the NR network. For example, the UE transmits a SIP message to reject the mobile terminating call via the NR network. The UE may perform the internet service via the NR network, e.g., while having the IMS service.

In one example, when the UE has an IMS service via the NR network after performing the first IMS registration and the second IMS registration, the UE rejects the mobile terminating call from the LTE network. For example, the UE transmits a SIP message to reject a mobile terminating call via the LTE network. In one example, the UE may perform an internet service via the LTE network, e.g., while having the IMS service. In one example, the UE may not be allowed to perform the internet service via the LTE network (or the UE may be configured to not perform the internet service via the LTE network, or the UE may determine not to perform the internet service via the LTE network), e.g., while having the IMS service.

In one example, if the UE is in an idle mode, the UE establishes a RRC connection (by performing a RRC connection establishment procedure) with the LTE network (the NR network) to transmit a paging response (e.g., a Service Request message) in response to a paging received from the LTE network (the NR network). Then, the LTE network (the NR network) configures a DRB to the UE, and the UE transmits a SIP message on the DRB. If the UE is in a light RRC connection (or inactive state), the UE resumes the RRC connection and the DRB (by performing a RRC connection resume procedure) with the LTE network (the NR network) in response to the paging received from the LTE network (the NR network). Then the UE transmits the SIP message on the DRB.

In one example, the mobile terminating call is an IMS voice call, an IMS video call or an IMS short message. In one example, the paging message includes information indicating the IMS service.

Realization of the processes 40-50 is not limited to the above description. The following examples may be applied to the processes 40-50.

In one example, if the UE fails to perform the IMS registration via the LTE network or the NR network, or the UE fails to register to the LTE network or the NR network, the UE may search a Wideband Code Division Multiple Access (WCDMA)/High Speed Packet Access (HSPA) network or a global system for mobile communications (GSM) network. If the UE finds the WCDMA/HSPA network or the GSM network, the UE registers to the WCDMA/HSPA network or the GSM network by transmitting a LOCATION UPDATING REQUEST message to the WCDMA/HSPA network or the GSM network. The UE receives a LOCATION UPDATING ACCEPT message from the WCDMA/HSPA network or the GSM network. In one example, if the UE fails to perform the IMS registration via the NR network or the UE fails to register to the NR network, the UE may search another LTE network. If the UE finds the other LTE network, the UE registers to the other LTE network by transmitting an ATTACH REQUEST message to the other LTE network. The UE receives an ATTACH ACCEPT message from the other LTE network.

In one example, the UE initiates/performs an internet service via the NR network, when the UE detects that the NR network is available. If the UE detects that the NR network is not available, the UE initiates the internet service via the LTE network. In one example, the UE does not find any NR cell (e.g., the UE loses coverage of the NR network) since the UE detects the NR network is not available. In one example, the UE suspends the NR operation since the UE detects the NR network is not available.

The IMS service may be an IMS voice call, an IMS video call or an IMS short message. The internet service may be web browsing, YouTube, FTP, Facebook, Twitter, Skype, Internet TV (e.g., Netflix), Line, WeChat or WhatsApp.

In one example, the UE registers to the LTE network and the NR network by using a same Universal Subscriber Identity Module (USIM) card. In one example, the UE registers to the LTE network by using a first USIM card, and registers to the NR network by using a second USIM card.

In one example, the UE registers to the LTE network (e.g., Mobility Management Entity (MME)/EPC) and the NR network (e.g., Access and Mobility Management Function (AMF)/5GC) by performing a LTE Non Access Stratum (NAS) registration procedure (e.g., Attach procedure) with the LTE network and a NR NAS registration procedure with the NR network.

In one example, the UE searches the LTE network, and performs the LTE NAS registration procedure first if the LTE network is available. When the UE completes the LTE NAS registration procedure with the LTE network, the UE may search the NR network, and perform the NR NAS registration procedure if the NR network is available. In one example, the UE may search the NR network, and perform the LTE NAS registration procedure first if the NR network is available. When the UE completes the NR NAS registration procedure with the LTE network, the UE may search the LTE network, and perform the NR NAS registration procedure if the LTE network is available. In one example, the UE may search and/or perform the LTE NAS registration procedure and the NR NAS registration procedure in parallel or simultaneously. The UE simultaneously maintain a first mobility management (MM) state with the LTE network and a second MM state with the NR network. After completing the LTE NAS registration procedure and the NR NAS registration procedure, the first MM state is REGISTERED (e.g., EMM-REGISTERED) and the second MM state is REGISTERED (e.g., RM-REGISTERED). That is, the UE registers to both the LTE network and the NR network.

When the UE initiates an IMS service via the LTE network, the UE establishes a DRB (configured by the eNB) and transmits a SIP message (e.g., SIP INVITE message) on the DRB to an IMS server via the eNB/EPC (e.g., serving gateway).

In one example, to register to the LTE network via an eNB, the UE establishes a RRC connection to the eNB and transmits an ATTACH REQUEST message or a TRACKING AREA UPDATE REQUEST message on the RRC connection to an EPC of the LTE network. The UE receives anATTACH ACCEPT message or a TRACKING AREA UPDATE ACCEPT message responding to the ATTACH REQUEST message or the TRACKING AREA UPDATE REQUEST message, on the RRC connection via the eNB from the EPC. In one example, the UE transmits UE capability information including LTE capabilities of the UE to the LTE network (e.g., on the RRC connection). The UE capability information may or may not include NR capabilities of the UE. Incase that the NR capabilities are not included, the LTE network may not configure the UE to measure a NR frequency, may not trigger a handover to the NR network for the UE, and/or may not configure LTE-NR dual connectivity for the UE. In case that the NR capabilities are included, according to the NR capabilities, the LTE network may configure the UE to measure the NR frequency, may trigger the handover to the NR network for the UE, and/or configure the LTE-NR dual connectivity for the UE.

In one example, to register to the NR network via a gNB, the UE establishes a RRC connection to the gNB and transmits an ATTACH REQUEST message or a TRACKING AREA UPDATE REQUEST message on the RRC connection to the 5GC of the NR network. The UE receives anATTACH ACCEPT message or a TRACKING AREA UPDATE ACCEPT message responding to the ATTACH REQUEST message or the TRACKING AREA UPDATE REQUEST message, on the RRC connection via the gNB from the 5GC.

In one example, to register to the NR network via the gNB, the UE establishes a RRC connection to the gNB and transmits a REGISTRATION REQUEST message on the RRC connection to the 5GC of the NR network. The UE receives a REGISTRATION ACCEPT message responding to the REGISTRATION REQUEST message on the RRC connection via the gNB from the 5GC.

In one example, the UE transmits UE capability information including NR capabilities of the UE to the NR network (e.g. on the RRC connection). The UE capability information may or may not include LTE capabilities of the UE. In case that the LTE capabilities are not included, the NR network may not configure the UE to measure a LTE frequency, may not trigger a handover to the LTE network for the UE and/or may not configure LTE-NR (or NR-LTE) dual connectivity for the UE. In case that the LTE capabilities are included, according to the LTE capabilities, the NR network may configure the UE to measure the LTE frequency, may trigger the handover to the LTE network for the UE and/or may configure the LTE-NR (or the NR-LTE) dual connectivity for the UE.

It should be noted that any of processes and examples above may be compiled into the program codes 314. Any of processes and examples above may be combined.

To sum up, the present invention provides a method and related communication device for performing an IMS service for dual mode UE. Thus, the dual mode UE can register the IMS service either on a 4G network or a 5G network, or even both at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for communicating with a long-term evolution (LTE) network and a new radio (NR) network, comprising:
   at least one storage device; and
   at least one processing circuit, coupled to the at least one storage device, wherein the at least one storage device stores, and the at least one processing circuit is configured to execute instructions of:
   registering to the LTE network and the NR network;
   performing a first IP multimedia subsystem (IMS) registration via the LTE network but not via the NR network, when registering to the LTE network and the NR network; and
   performing a second IMS registration via the NR network, when failing to perform the first IMS registration via the LTE network;
   suspending a NR operation when having an IMS service via the LTE network, after performing the first IMS registration; and
   resuming the NR operation, after finishing the IMS service.

2. The communication device of claim 1, wherein the instructions further comprise:
   establishing a Packet Data Network (PDN) connection with the LTE network by performing a PDN connectivity procedure with the LTE network.

3. A communication device for communicating with a long-term evolution (LTE) network and a new radio (NR) network, comprising:
   at least one storage device; and
   at least one processing circuit, coupled to the at least one storage device, wherein the at least one storage device stores, and the at least one processing circuit is configured to execute instructions of:
   registering to the LTE network and the NR network;
   performing a first IP multimedia subsystem (IMS) registration via the LTE network and performing a second IMS registration via the NR network, when registering to the LTE network and the NR network;
   suspending a NR operation when having an IMS service via the LTE network, after performing the first IMS registration and the second IMS registration; and
   resuming the NR operation, after finishing the IMS service.

4. The communication device of claim 3, wherein the instructions further comprise:
   establishing a Packet Data Network (PDN) connection with the LTE network by performing a PDN connectivity procedure with the LTE network; and
   establishing a Protocol Data Unit (PDU) Session with the NR network by performing a PDU Session establishment procedure with the NR network.

5. The communication device of claim 3, wherein the instructions further comprise:
   ignoring a paging for a mobile terminating call from the NR network when having an IMS voice call or an IMS video call via the LTE network, after performing the first IMS registration and the second IMS registration.

6. The communication device of claim 3, wherein the instructions further comprise:
   rejecting a mobile terminating call from the NR network when having an ongoing IMS voice call or an ongoing IMS video call via the LTE network, after performing the first IMS registration and the second IMS registration.

7. The communication device of claim 3, wherein the instructions further comprise:
   rejecting a mobile terminating call from the LTE network when having an ongoing IMS voice call or an ongoing IMS video call via the NR network, after performing the first IMS registration and the second IMS registration.

* * * * *